United States Patent
Cheah et al.

(10) Patent No.: US 7,701,565 B2
(45) Date of Patent: Apr. 20, 2010

(54) OPTICAL NAVIGATION SYSTEM WITH ADJUSTABLE OPERATING Z-HEIGHT

(75) Inventors: Chiang Sun Cheah, Penang (MY); Chin Heong Yeoh, Penang (MY); Ak Wing Leong, Penang (MY)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 18 days.

(21) Appl. No.: 11/401,970

(22) Filed: Apr. 10, 2006

(65) Prior Publication Data

US 2007/0236456 A1 Oct. 11, 2007

(51) Int. Cl.
*G01B 11/26* (2006.01)
(52) U.S. Cl. .................................. 356/139.04
(58) Field of Classification Search ............. 356/139.04, 356/3.01–3.15, 4.01–4.1, 5.01–5.15, 6–22, 356/139.01–139.1
See application file for complete search history.

(56) References Cited

U.S. PATENT DOCUMENTS

| 3,882,603 | A  | * | 5/1975  | Distel ............................ 33/431 |
| 3,961,831 | A  | * | 6/1976  | Showell et al. ............... 312/200 |
| 7,439,954 | B2 | * | 10/2008 | Theytaz et al. ............... 345/166 |
| 2003/0130562 | A1 | * | 7/2003 | Barbato et al. ............... 600/109 |
| 2005/0024624 | A1 | * | 2/2005 | Gruhlke et al. ............... 356/3.01 |
| 2005/0231465 | A1 | * | 10/2005 | DePue et al. ................. 345/156 |
| 2006/0187208 | A1 | * | 8/2006 | Wenstrand et al. .......... 345/166 |

\* cited by examiner

*Primary Examiner*—Thomas H Tarcza
*Assistant Examiner*—Luke D Ratcliffe (57) ABSTRACT

An optical navigation system having an illuminator housing and a sensor housing that are movably connected at a connection point with a connection mechanism, which may include a pivot. The illuminator housing and the sensor housing may be rotated about the connection point relative to each other so that the optical navigation system may be configured with a desired operating Z-height. The optical navigation system may also include a locking mechanism to lock the illuminator housing and the sensor housing in a predetermined fixed position after the desired operating Z-height has been selected.

20 Claims, 7 Drawing Sheets

OPTICAL NAVIGATION SYSTEM WITH ADJUSTABLE OPERATING Z-HEIGHT

BACKGROUND OF THE INVENTION

Non-mechanical tracking devices, such as computer mice, are rapidly growing in popularity worldwide. Many of these non-mechanical tracking devices utilize optical navigation technology that measures the changes in position of the non-mechanical tracking devices by optically acquiring sequential surface images and mathematically determining the direction and magnitude of the movement.

As an example, in a non-mechanical tracking device such as an optical mouse, optical navigation technology involves capturing an image and then analyzing and tracking the motion of microscopic texture or other features on a surface under the optical mouse. In general, these types of optical mice depend on tracking surface detail and require work surfaces that are microscopically textured. When such surface textures are illuminated by a light source such as a light emitting diode ("LED"), a pattern of highlights and shadows is revealed. Optical mice then "watch" these surface details move by imaging them onto navigation integrated circuits ("navigation ICs").

Figure 1:
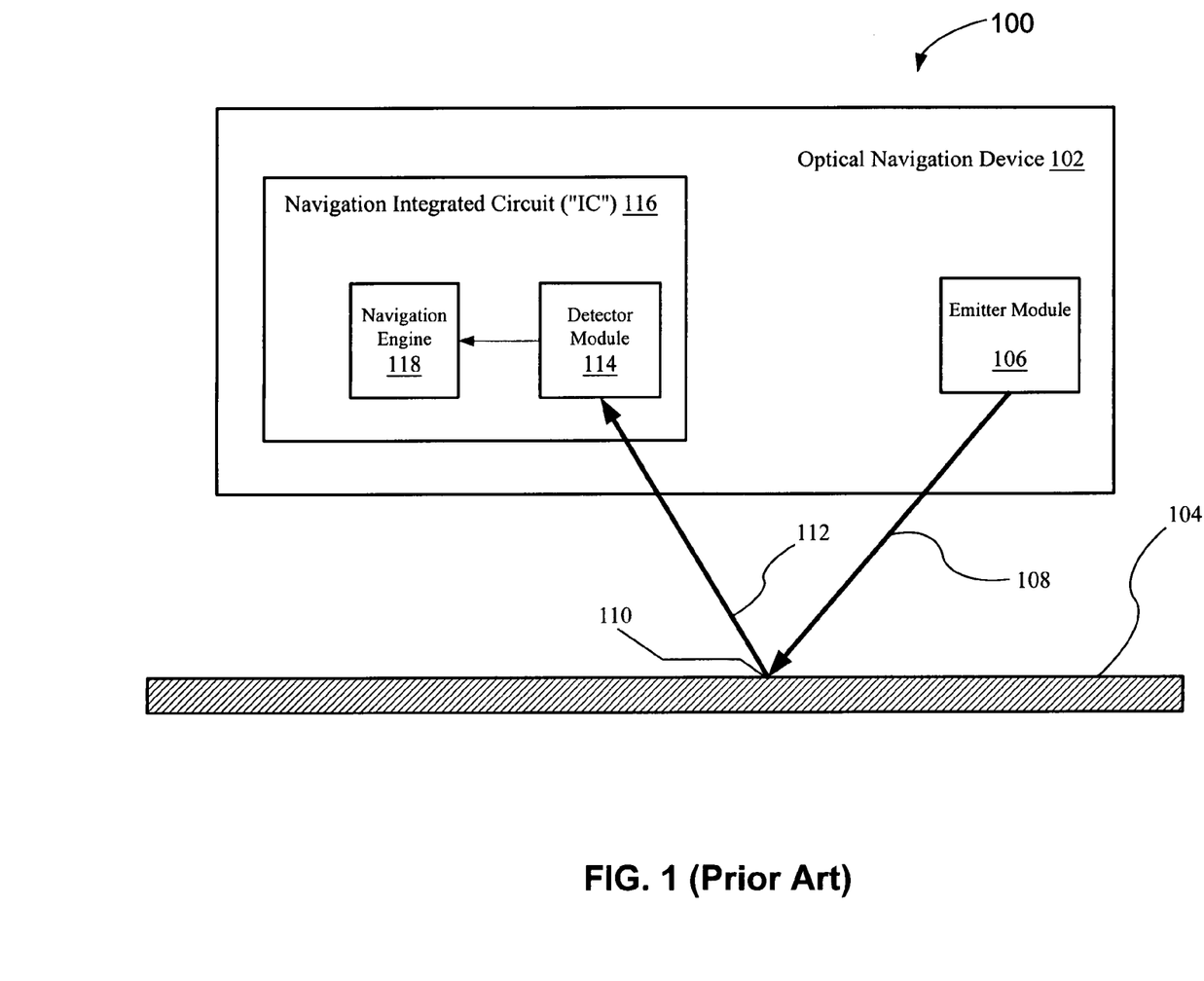
FIG. 1 is a block diagram side view of an example of an implementation of a known non-mechanical navigation device.

As an example, in FIG. 1, a block diagram 100 of an example of a known implementation of an optical navigation device 102 above a navigation surface 104 is shown. The optical navigation device 102 may be a non-mechanical tracking device such as an optical mouse. Generally, optical navigation technology involves capturing an image on the navigation surface 104 and then analyzing and tracking the motion of microscopic texture or other features on the navigation surface 104 under the optical navigation device 102.

In an example of operation, these surface textures are illuminated by a light source such as an LED in an emitter module 106 that may emit emitted optical radiation 108 at the navigation surface 104, and a pattern of highlights and shadows is revealed at a point of illumination 110 on the navigation surface 104. The optical navigation device 102 then "watches" the surface details of the navigation surface 104 move by receiving reflected optical radiation 112 from the navigation surface 104 details at the point of illumination 110 at a detector module 114 in the optical navigation device 102. The detector module 114 may be part of a navigation integrated circuit ("IC") 116 located within the optical navigation device 102. The navigation IC 116 may also include a navigation engine 118 where the navigation engine 118 is a device capable of receiving imaging information from the detector module 114 and, in response, determining the position of the optical navigation device 102.

Figure 2:
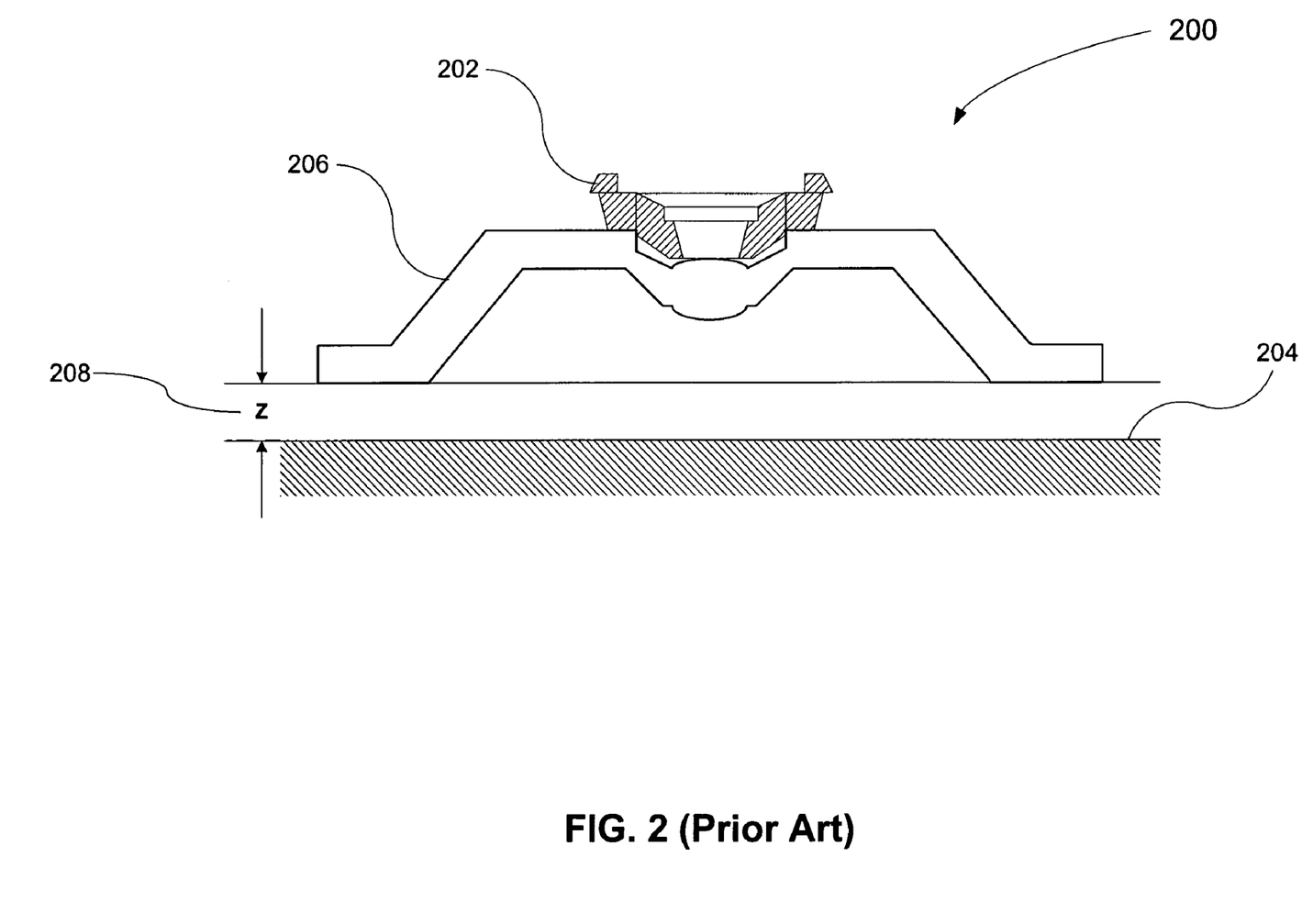
FIG. 2 is a simplified block diagram side view of an example of an implementation of an optical navigation system with a light emitting diode ("LED") illuminator source that shows the operating Z-height dimension.

Unfortunately, although widely used as computer input devices, optical navigation devices such as the non-mechanical device 100 have not been widely used in many other applications. This is due primarily to the fixed operating Z-height of these devices, as well as the large form factor, i.e., footprint, of these devices. FIG. 2 shows a cross-sectional side view of a typical optical mouse sensor 200, with an optical sensor 202 attached to lens 206, sometimes with a clip (not shown). In an example of operation, a light emitting diode ("LED") illuminator source (not shown) emits light that is reflected from the navigation surface 204. In this particular device, the Z-height 208, which is the distance from the lens reference plane to the navigation surface 204, may typically be 2.4 millimeters ("mm"), ±0.1 mm, and is fixed at that dimension. A typical mouse device may also have, for example, a form factor of approximately 10.0 mm×12.5 mm.

Because optical navigation devices with an adjustable operating Z-height and a smaller form factor would find usage in many more additional applications, there is a need for such an optical navigation system having a non-fixed or adjustable Z-height and a smaller form factor.

SUMMARY

An optical navigation system whose operating Z-height is capable of being adjusted is disclosed. The optical navigation system may include two separate housings, one in which an optical navigation sensor is enclosed, and the other in which an illuminator source is enclosed. The housings may be movably connected together at a connection point such that the angle between the sensor housing and the illuminator housing may be varied in order that the operating Z-height of the optical navigation system may be adjusted to the desired dimension. The optical navigation system may also include a locking mechanism that fixes the two housings relative to each other so as to maintain the desired operating Z-height. In another implementation, the sensor housing and the illuminator housing may be manufactured as a single unit, with the sensor housing and the illuminator housing affixed permanently to each other at the desired angle that produces the required operating Z-height.

The illuminator housing may include at least one light source configured to emit emitted optical radiation at a navigation surface and a collimating lens that collimates the emitted optical radiation to the navigation surface. The sensor housing may include an imaging lens and an optical sensor that receives reflected optical radiation from the navigation surface. The illuminator housing and the sensor housing are rotated relative to each other, thereby changing the operating Z-height of the optical navigation system.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description, reference is made to the accompanying drawings that form a part hereof, and which show, by way of illustration, a specific embodiment in which the invention may be practiced. Other examples of implementations may be utilized and structural changes may be made without departing from the scope of the present invention.

Figure 3A:
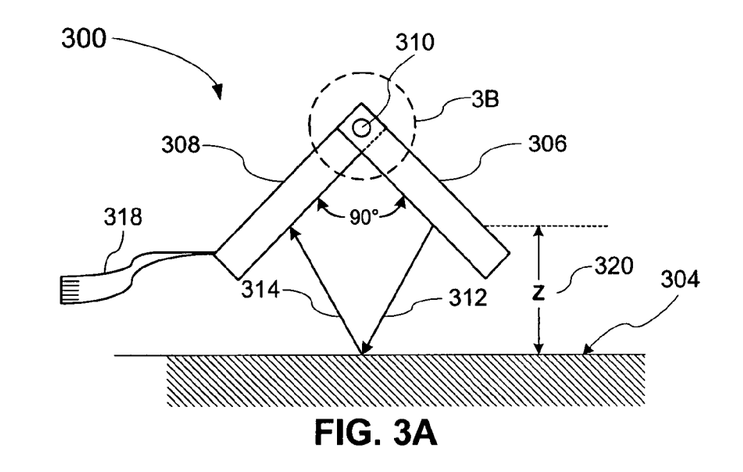
FIG. 3A is a block diagram side view of an example of an implementation of an optical navigation system having two movable housings that enclose an illuminator source and an optical sensor, respectively, with the two movable housings set at an angle of 90°.

In FIG. 3A, a block diagram of a side view an example of an implementation of an optical navigation system 300 with two separate movable housings 306 and 308, one for an illuminator source and one for an, optical sensor is shown above a navigation surface 304. The illuminator housing 306 may include an illuminator source (not shown), which may be an LED, laser, or other light source, and a collimating lens (not shown) that collimates the light emitted by the illuminator source. The collimated light 312 is emitted from the illuminator housing 306 at the navigation surface 304.

The sensor housing 308 may include an optical navigation integrated circuit ("navigation IC") (not shown) having an optical sensor (not shown) and an imaging lens (not shown). The imaging lens (not shown) focuses the received reflected optical radiation 314 from the navigation surface 304 at an optical sensor (not shown) that may be a pixel array within the sensor housing 308. The pixel array may be located directly on the focal length of the imaging lens to capture the images reflected from the navigation surface 304.

Figure 3B:
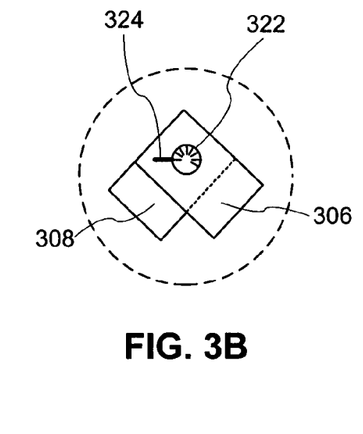
FIG. 3B is a portion of FIG. 3A enlarged in order to show additional detail.

The sensor housing 308 and the illuminator housing 306 are movably connected at a connection point with a connection mechanism, pivot 310 and the two housings may be rotated to achieve a different operating Z-height. In FIG. 3A, the optical navigation system 300 is shown configured at a 90° angle, which results in the operating Z-height 320. In FIG. 3B, the pivot 310 connecting sensor housing 308 and illuminator housing 306 are shown in greater detail, having Z-height scale indicator 322 placed on the surface of the pivot 310 and an operating Z-height reference point 324 located on the illuminator housing 306. Each notched mark on the Z-height scale indicator 322 may be translated into a known predetermined operating Z-height. The sensor housing 308 may include a flex cable 318 that connects an optical sensor (not shown) to a sensor printed circuit board ("PCB") (not shown). The illuminator housing 306 may have a separate flex cable (not shown) or may be in electrical connection to flex cable 318. The optical navigation system 300 may also include a locking mechanism (not shown) that locks the pivot 310 into the various positions indicated by the Z-height scale indicator 322.

Figure 4A:
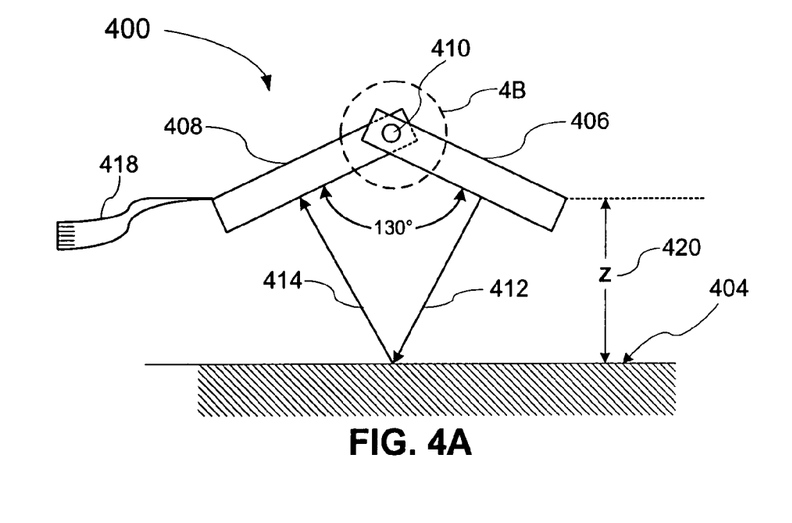
FIG. 4A is a block diagram side view of the example of an implementation of an optical navigation system shown in FIG. 3A having two movable housings that enclose an illuminator source and an optical sensor, respectively, with the two movable housings set at an angle of approximately 130°.

In FIG. 4A, a block diagram of a side view of the example of the implementation of optical navigation system 300, FIG. 3A, is shown in a different configuration, i.e., the illuminator housing 306 and the sensor housing 308 are set at a different angle. The illuminator housing 406 may include an illuminator source (not shown), which may be an LED, laser, or other light source, and a collimating lens (not shown) that collimates the light emitted by the illuminator source. The collimated light 412 is emitted from the illuminator housing 406 at the navigation surface 404.

As in FIG. 3A, the sensor housing 408 may include an optical navigation integrated circuit ("navigation IC") (not shown) having an optical sensor (not shown) and an imaging lens (not shown). The imaging lens (not shown) focuses the received reflected optical radiation 414 from the navigation surface 404 at an optical sensor (not shown) that may be a pixel array within the sensor housing 408. The pixel array may be located directly on the focal length of the imaging lens to capture the images reflected from the navigation surface 404.

The sensor housing 408 and the illuminator housing 406 are movably connected at pivot 410 and the two housings may be rotated to achieve a different operating Z-height. In FIG. 4A, the optical navigation system 400 is shown configured at a 130° angle, which results in the operating Z-height 420, which is greater in length than that of the operating Z-height 320, FIG. 3A.

Figure 4B:
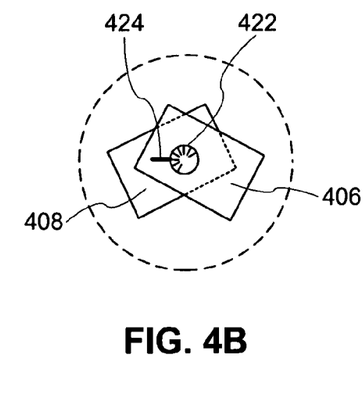
FIG. 4B is a portion of FIG. 4A enlarged in order to show additional detail.

In FIG. 4B, the pivot 410 connecting sensor housing 408 and illuminator housing 406 are shown in greater detail, having Z-height scale indicator 422 placed on the surface of the pivot 410 and an operating Z-height reference point 424 located on the illuminator housing 406. Each notched mark on the Z-height scale indicator 422, relative to the operating Z-height reference point 424, may be translated into a known predetermined operating Z-height. For example, in FIG. 4B, the operating Z-height reference point 424 indicates a different operating Z-height, relative to that shown in FIGS. 3A and 3B, by reason of the different angle between the sensor housing 408 and the illuminator housing 406.

The sensor housing 408 may include a flex cable 418 that connects an optical sensor (not shown) to a sensor printed circuit board ("PCB") (not shown). The illuminator housing 406 may have a separate flex cable or may be in electrical connection to flex cable 418. The optical navigation system 400 may also include a locking mechanism (not shown) that locks the pivot into the various positions indicated by the Z-height scale indicator 422.

Figure 5:
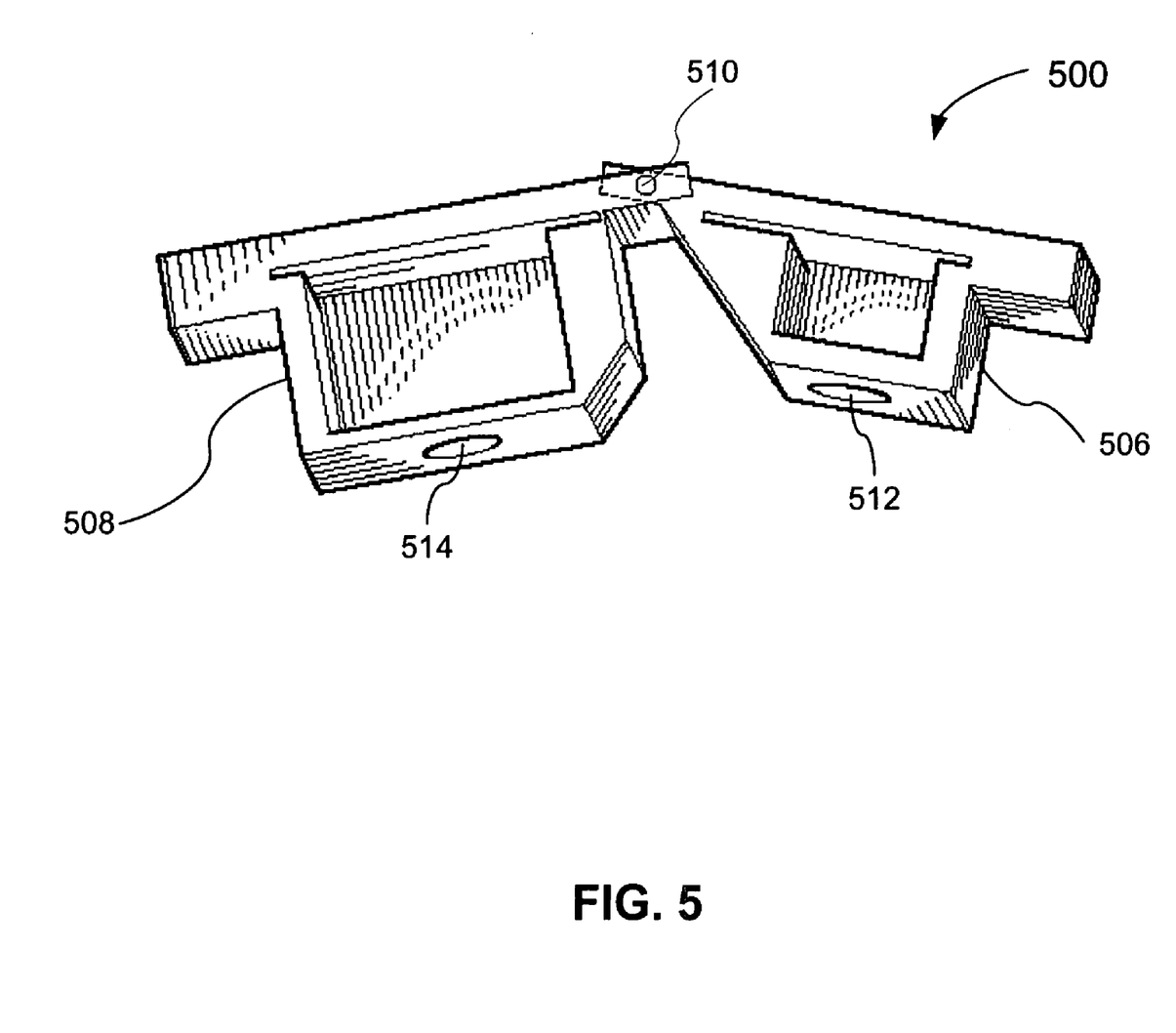
FIG. 5 is a 3-dimensional perspective view of two movable housings that enclose an illuminator source and an optical sensor, respectively, connected at a pivot point.

FIG. 5 is a 3-dimensional perspective view of the two movable housings that enclose an illuminator source and an optical sensor, respectively, connected at a pivot point. In FIG. 5, an illuminator housing 506 is attached to a sensor housing 508 at the pivot 510. In the illuminator housing 506, a light source (not shown) may emit emitted radiation through the illuminator aperture 512 to a navigation surface (not shown). The emitted radiation is then reflected back through the sensor aperture 514 into the sensor housing 508. By changing the positioning of the illuminator housing 506 and the sensor housing 508 relative to each other, the operating Z-height of the device may be adjusted.

Figure 6:
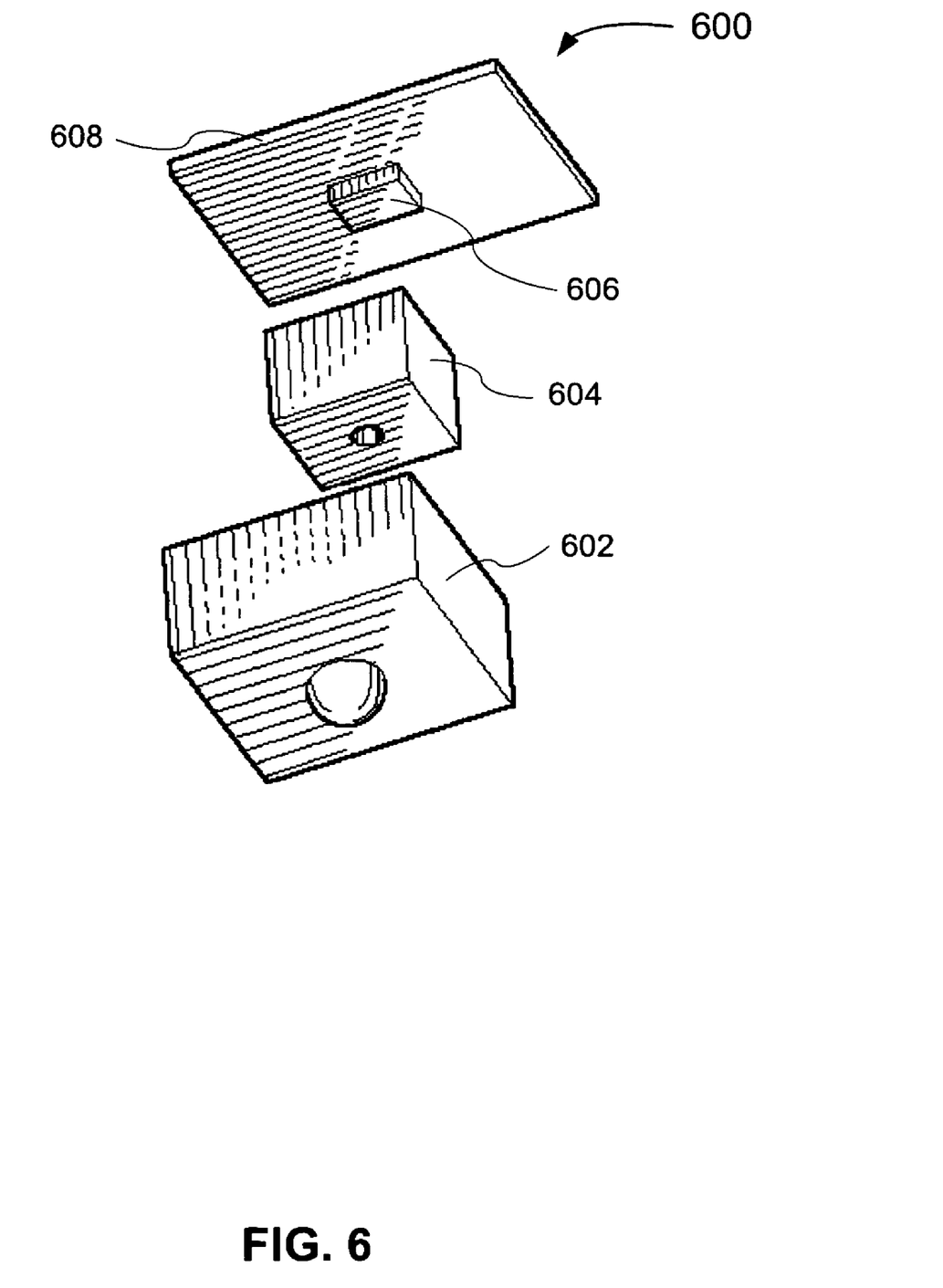
FIG. 6 is an exploded 3-dimensional perspective view of an example implementation of the sensor housing shown in FIGS. 3A and 4A.

FIG. 6 shows an exploded 3-dimensional perspective view of an example of the components that may be used in the sensor housings 308 and 408 shown in FIGS. 3A and 4A, respectively. Imaging lens 602 may be configured to receive the reflected light 314 and 414 shown in FIGS. 3A and 4A, respectively, and then focus this reflected light so that it passes through sensor aperture 604. Upon passing through sensor aperture 604, the reflected light then is received by the sensor die 606 positioned in substrate 608. Once the images from the navigation surface are acquired by the sensor die 606, they may be analyzed to track the motion of the microscopic texture or other features on the navigation surface as in any other optical navigation device.

Figure 7:
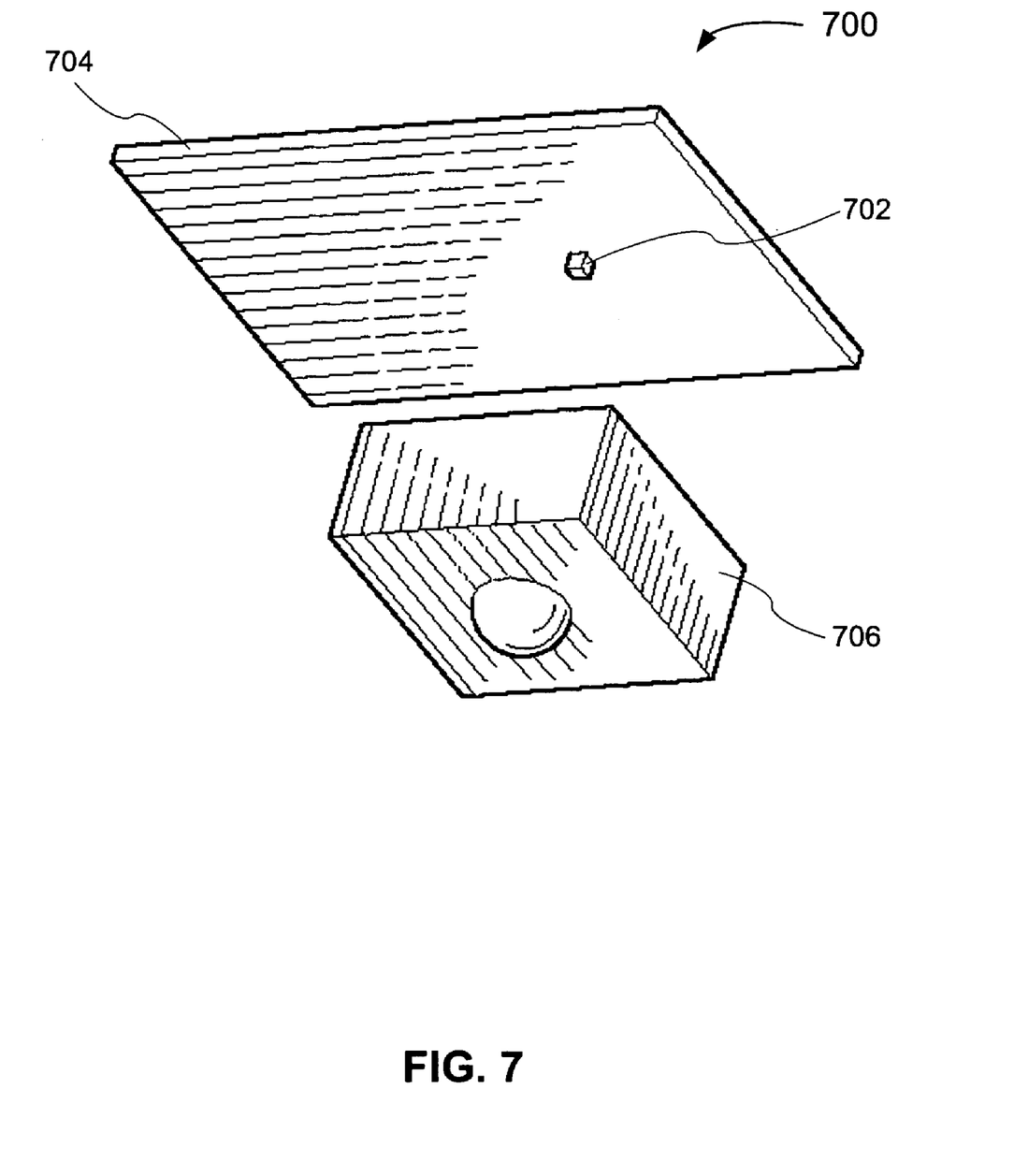
FIG. 7 is an exploded 3-dimensional perspective view of an example implementation of the illuminator housing shown in FIGS. 3A and 4A.

In FIG. 7, an exploded 3-dimensional perspective view of an example of the components that may be used in the illuminator housings 306 and 406 shown in FIGS. 3A and 4A, respectively, is shown. In FIG. 7, the illuminator source shown is an LED die 702 affixed to a substrate 704. Emitted optical radiation is emitted by the LED die 702 that is collimated by the collimating lens 706 and the collimated optical radiation may then be emitted to a navigation surface (not shown) and reflected to the sensor housings 308 and 408 shown in FIGS. 3A and 4A.

Figure 8:
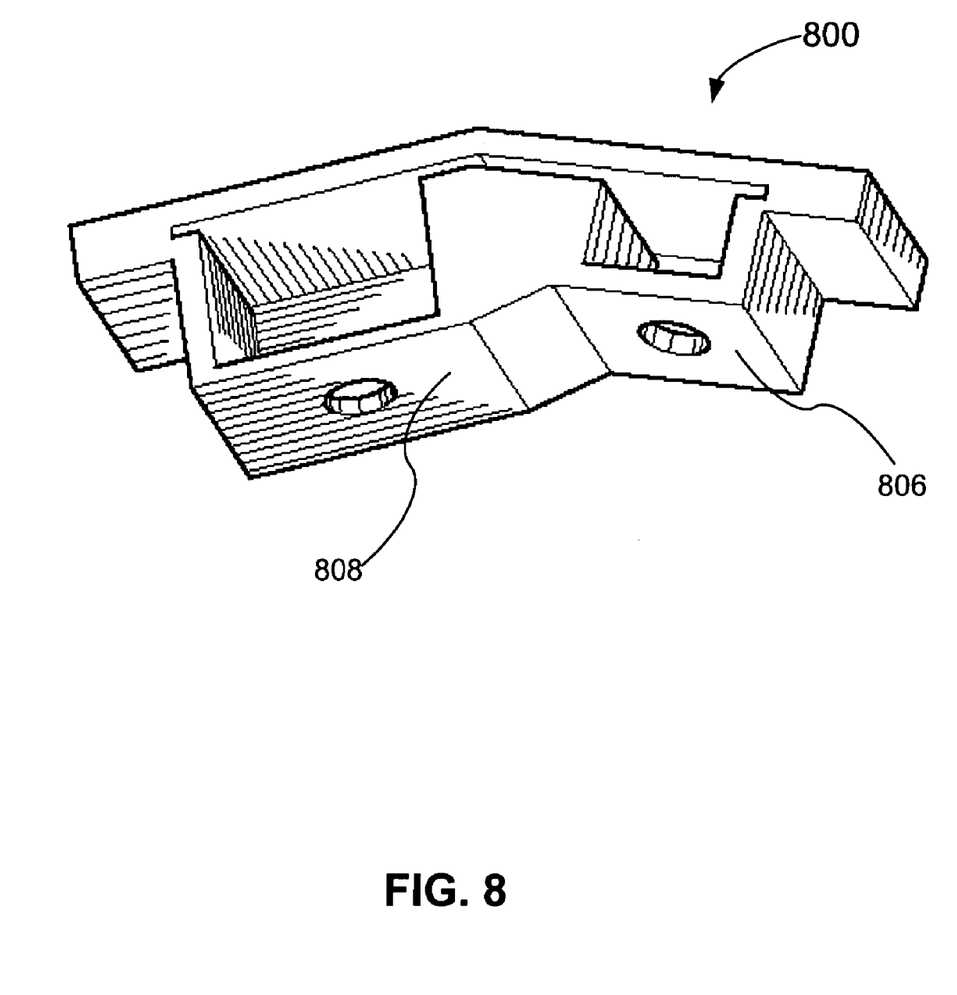
FIG. 8 is a 3-dimensional perspective view of two movable housings that enclose an illuminator source and an optical sensor, respectively, permanently connected at a fixed angle.

The optical navigation devices shown in FIGS. 3, 4, and 5 are easily adjustable with respect to the operating Z-height. There may be, however, a need to further reduce the costs of the assembly process for devices that have to be manufactured in high volume. FIG. 8 shows an example of an implementation of an optical navigation device 800 that may include an illuminator housing 806 and a sensor housing 808 that are affixed permanently at an angle that results in the desired operating Z-height.

While the foregoing description refers to an optical navigation system using an LED, the subject matter of this disclosure is not limited to such systems but also includes, in general, other optical navigation systems that may use other illumination sources such as a diode, photo-diode, light bulb, a vertical cavity surface-emitting laser ("VCSEL"), or other semiconductor lasers such as an edge-emitting laser. Also, the optical sensor may include an array of photo-detectors such as photo-diodes, photo-cathodes, or photo-multipliers. It is appreciated by those skilled in the art that the optical radiation may be visible, infrared, and/or ultraviolet light radiation.

It will also be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. An optical navigation system having an adjustable operating Z-height, the optical navigation system comprising:
    an illuminator housing to substantially enclose an illumination source; and
    a sensor housing to substantially enclose an optical sensor, wherein the sensor housing is movably connected to the illuminator housing at a connection point with a connection mechanism, wherein both the illuminator housing and the sensor housing are rotatable about the connection point.

2. The optical navigation system of claim 1, wherein the connection mechanism is a pivot.

3. The optical navigation system of claim 2, wherein the illuminator housing includes:
    at least one illumination source; and
    at least one collimating lens.

4. The optical navigation system of claim 3, wherein the at least one illumination source is configured to emit optical radiation in a wavelength range chosen from the group consisting of visible light, infrared light, ultraviolet, and x-ray radiation.

5. The optical navigation system of claim 4, wherein the at least one illumination source is chosen from a group consisting of at least one diode, light emitting diode ("LED"), photo-cathode, laser, and light bulb.

6. The optical navigation system of claim 5, wherein the laser is a Vertical Cavity Surface-Emitting Laser ("VCSEL").

7. The optical navigation system of claim 6, wherein the optical navigation system further includes means for indicating the relative positions of the illuminator housing and the sensor housing.

8. The optical navigation system of claim 7, wherein the means for indicating the relative positions of the illuminator housing and the sensor housing includes a Z-height scale indicator and an operating Z-height reference.

9. The optical navigation system of claim 2, wherein the sensor housing further includes:
    at least one imaging lens; and
    the optical sensor.

10. The optical navigation system of claim 9, wherein the optical sensor is a pixel array.

11. The optical navigation system of claim 2, further including a locking mechanism to lock the pivot in position after an operating Z-height has been selected for the optical navigation system.

12. A method for configuring an optical navigation system with a predetermined operating Z-height, the method comprising:
    movably connecting an illuminator housing to a sensor housing at a connection point with a connection mechanism, wherein the illuminator housing is configured to substantially enclose an illumination source, and the sensor housing is configured to substantially enclose an optical sensor;
    rotating the illuminator housing and the sensor housing relative to each other and about the connection point until the illuminator housing and the sensor housing are configured in the predetermined operating Z-height; and
    locking the illuminator housing and the sensor housing into a fixed configuration.

13. The method of claim 12, wherein the connection mechanism is a pivot.

14. The method of claim 13, wherein
    the illuminator housing includes at least one illumination source; and
    the sensor housing includes at least one imaging lens and the optical sensor.

15. The method of claim 13, wherein rotating the illuminator housing relative to the sensor housing further includes aligning a Z-height scale indicator and an operating Z-height reference.

16. An optical navigation system having an adjustable operating Z-height, the optical navigation system comprising:
    an illuminator housing having at least one illumination source and at least one collimating lens, wherein the illuminator housing substantially encloses the at least one illumination source;
    a sensor housing having at least one imaging lens and an optical sensor, wherein the sensor housing substantially encloses the optical sensor; and
    a pivot that movably connects the illuminator housing to the sensor housing and about which both the illuminator housing and the sensor housing are rotated to set an angle between the illuminator housing and the sensor housing.

17. The optical navigation system of claim 16, further including means for indicating the relative positions of the illuminator housing and the sensor housing that correspond to a predetermined operating Z-height.

18. The optical navigation system of claim 17, further including means for locking the illuminator housing and the sensor housing in position after selecting an operating Z-height for the optical navigation system.

19. The optical navigation system of claim 1, wherein the illumination housing and the sensor housing are separate monolithic structures that are connected by the connection mechanism.

20. The optical navigation system of claim 2, wherein the illumination housing and the sensor housing are both directly connected to the pivot.

* * * * *